United States Patent
Shaffer et al.

(10) Patent No.: US 7,110,510 B1
(45) Date of Patent: Sep. 19, 2006

(54) SYSTEM AND METHOD FOR HANDLING OF THREADED MESSAGES

(75) Inventors: Shmuel Shaffer, Palo Alto, CA (US); William J. Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 09/246,409

(22) Filed: Feb. 8, 1999

(51) Int. Cl.
*H04M 1/64* (2006.01)
*H04M 11/10* (2006.01)

(52) U.S. Cl. .................................. 379/88.25; 455/413

(58) Field of Classification Search ............. 379/88.11, 379/88.13, 88.27; 707/3, 10; 709/206, 218
See application file for complete search history.

(56) References Cited

U.S. PATENT DOCUMENTS

| | | | | |
|---|---|---|---|---|
| 5,835,084 A | * | 11/1998 | Bailey et al. | 715/783 |
| 6,167,395 A | * | 12/2000 | Beck et al. | 707/3 |
| 6,304,573 B1 | * | 10/2001 | Hicks, III | 370/401 |
| 6,330,589 B1 | * | 12/2001 | Kennedy | 709/206 |
| 6,430,177 B1 | * | 8/2002 | Luzeski et al. | 370/356 |
| 6,549,950 B1 | * | 4/2003 | Lytle et al. | 709/246 |

FOREIGN PATENT DOCUMENTS

| | | |
|---|---|---|
| GB | 2 327 516 | 1/1999 |
| WO | WO 93/20640 | 10/1993 |
| WO | WO 97/46962 | 12/1997 |
| WO | WO 99/48011 | 9/1999 |

OTHER PUBLICATIONS

IBM Research Disclosure #420121, Apr. 10, 1999, "Saving E-mail Documents/Discussion Trends".
Copy of European Search Report for GB Appln. No. 0002757.3; date search was completed: Sep. 8, 2000.

* cited by examiner

*Primary Examiner*—Gerald Gauthier

(57) ABSTRACT

A messaging system (300) capable of handling threaded messages. Older messages (400, 402) in a thread may be identified as having already been read or opened, and handled in the same way as later messages (404) in the thread. If a user opens an intermediate message (402) in a thread, he is informed of the presence of a more recent message (404) on the same topic and is offered the chance to open that message instead.

20 Claims, 7 Drawing Sheets

| | # | | Type | From | Date | Threaded In | F/P | Comp. Thr. |
|---|---|---|---|---|---|---|---|---|
| (400c) | 1 | | | A | | 2, 3 | | |
| (402c) | 2 | | | X | | 3 | | 1 |
| (404c) | 3 | | | Y | | | | 1, 2 |
| | 4 | | | | | | | |

SYSTEM AND METHOD FOR HANDLING OF THREADED MESSAGES

BACKGROUND OF THE INVENTION

1. Field of the Invention

This invention generally relates to messaging systems and, particularly, to a messaging system for handling threaded messages in a recipient's mailbox.

2. Description of the Related Art

Message processing systems have been in widespread use for many years. These systems, such as a voice messaging system, are commonly used as message sending, receiving and storing tools. In particular, voice messaging systems are commonly known as voice mail systems (VMS). In such systems, each user is assigned a mailbox wherein messages sent to the user are saved. The recipient of a message, upon accessing the VMS, may retrieve messages from his or her mailbox. In the past, voice mail systems had limited capabilities. For example, users of the earliest systems could only send messages and store messages for later playback.

Advanced functionality has been added to the VMS. Present day systems not only store messages, but can forward messages to one or more recipients; message replies can be automatically sent to the sender; and messages can be attached to other messages before being sent to their final destination.

Often, a message may be "threaded," i.e., forwarded with attached materials. For example, a voice message may be forwarded with additional comments. A lengthy dialogue can result in multiple messages in the user's mailbox on the same subject. Upon playback by the recipient, the (usually, most recent) message contains the entire string. However, to clear the mailbox, the user must listen to all of the messages, including earlier ones that have been threaded together into later ones in the string. The user must therefore waste time on already listened-to messages before the mailbox may be cleared.

Electronic mail, or e-mail, systems similarly allow "threading" of messages. Typically, the entire message is included in a "Reply" or "Forward," including the message header and original recipients. Again, however, redundancy in messages results, since the earlier messages which have been threaded remain, and the user must waste time in opening and/or filing or deleting them.

Accordingly, there is a need for a messaging system having improved handling of threaded messages.

SUMMARY OF THE INVENTION

These disadvantages in the prior art are overcome in large part by a system and method according to the present invention. According to one aspect of the invention, older messages in a thread may be identified as having already been read or opened, and handled in the same way as later messages in the thread. According to another aspect of the invention, if a user opens an intermediate message in a thread, he is informed of the presence of a more recent message on the same topic and is offered the chance to open that message instead.

According to one aspect of the invention, a computer-based, unified messaging system is provided. The unified messaging system employs a graphical user interface (GUI) to allow the user to access messages, for example, by highlighting and clicking on them with a mouse. Voice messages are then delivered via the computer's sound system; e-mail messages are displayed via an e-mail interface window.

The unified messaging system identifies both e-mail messages and voice mail messages that are a part of a thread, and may also include a pointer or identifier of the most inclusive message. When the most inclusive message is highlighted and read (or listened to), the component messages are also indicated as having been read. When actions are to be undertaken on the most inclusive messages, the components may be treated the same way.

In the case of e-mail, the unified messaging system is configured to identify attachments to messages as well as messages or parts of messages sage. In the case of attachments, the unified messaging system is able to identify file types and read message header information. In the case of incorporated messages, the system is able to identify whether all or part of the incorporated message is now part of the threaded message. If only a part of the incorporated message has been included, the message may be flagged and a dialogue or pop-up box provided to give the user the option to treat the message as having been read.

Another embodiment of the present invention includes a voice mail system which is not part of a unified messaging system. Such a system, which employs a voice and telephone type interface, tags threaded messages for treatment similar to that for the most inclusive message. In particular, the messages may be delivered to the user in order from the most inclusive on down. Then, an audible indication may be provided to the user that the message has already been listened to. Then, when the most inclusive message is deleted or saved, similar treatment may occur for the components of the thread.

BRIEF DESCRIPTION OF THE DRAWINGS

A better understanding of the invention is obtained when the following detailed description is considered in conjunction with the following drawings in which.

DETAILED DESCRIPTION OF THE INVENTION

Figure 1:
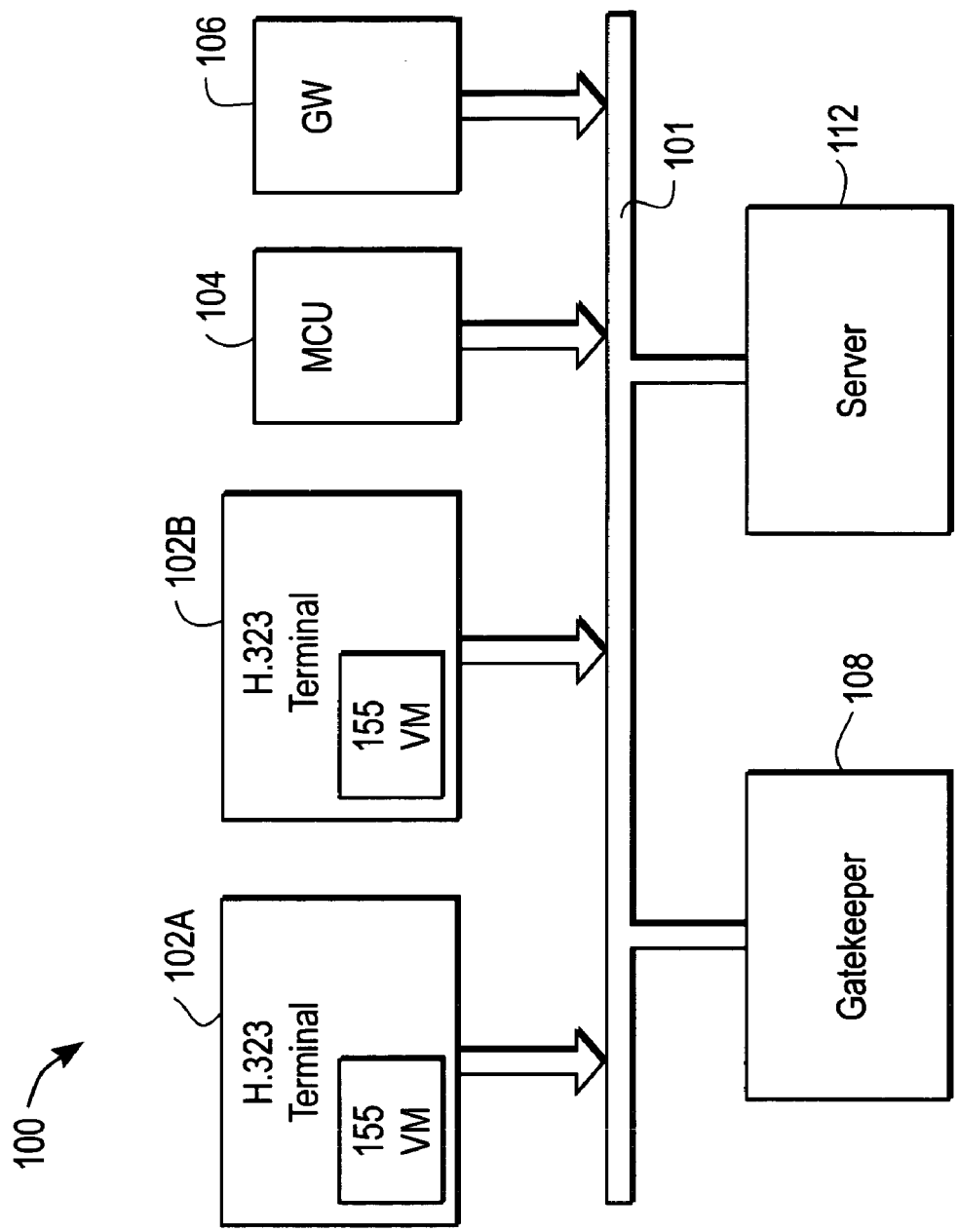
FIG. 1 is a diagram illustrating a communications system including messaging capabilities according to an embodiment of the present invention.

Turning now to the drawings, and with particular attention to FIG. 1, a diagram 100 illustrating a telecommunications system according to an embodiment of the present invention is shown. In particular, the telecommunications system 100 includes a local area network (LAN) or packet network 101. Coupled to the LAN 101 may be a variety of H.323 terminals 102a, 102b, a multi-point control unit (MCU) 104, an H.323 gateway 106, an H.323 gatekeeper 108, a LAN server 112 and a plurality of other devices such as personal computers (not shown). The H.323 terminals 102a, 102b are in compliance with the H.323 standard. Thus, the H.323 terminals 102a, 102b support H.245 for negotiation of channel usage, H.225/Q.931 for call signaling and call setup, registration admission status (RAS), and RTP/RTCP for sequencing audio and video packets. The H.323 terminals 102a, 102b may further implement audio and video codecs, T.120 data conferencing protocols and MCU capabilities. Further details concerning the Recommendation H.323 may be obtained from the International Telecommunications Union; the Recommendation is hereby incorporated by reference in its entirety as if fully set forth herein.

In addition, each H.323 terminal 102a, 102b may include a voicemail system 155 according to the present invention. The H.323 terminals 102a, 102b may be embodied as add-on boards in personal computers attached to the LAN, or as stand-alone H.323 telephones. In either case, a voicemail system 155 may be provided. In the former case, a graphical user interface (FIG. 5), such as for Windows 95 or higher, or Windows NT, may be provided for accessing the voicemail messages. In the latter, a standard interactive voice response (IVR) system may be provided.

According to the present invention, as will be described in greater detail below, voicemail messages may be threaded and identified as such. In particular, as will be described in greater detail below, the voicemail system monitors whether a message contains any other threaded messages. When a message which contains a threaded message is opened, the components of the thread are also marked as "opened," or as parts of a thread. When the user wishes to delete or perform some other act on the threaded message, the components of the thread are also deleted, or otherwise similarly treated. Further, if the user opens a message which is intermediate in a thread, he is given a prompt which allows him to open either the most recent or oldest message in the thread first.

Figure 2:
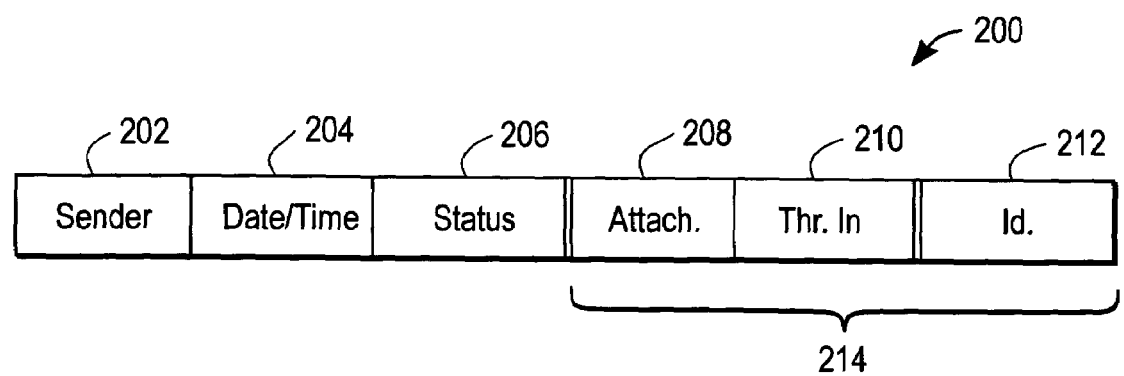
FIG. 2 is a diagram illustrating an exemplary message header according to an embodiment of the invention.

To do so, a specific embodiment of the present invention employs the electronic header information that is provided with each message which uniquely identifies the message. For example, turning the FIG. 2, an exemplary header 200 includes various information fields, including a sender's identification field 202, a unique message identification field 212, a date and time field 204, identifying time the message was received, a status field 206, and special handling codes 214, including an attachments field 208 and a "threaded in" field 210. The attachments field 208 identifies those messages which are attached to the current message; the threaded in field 210 identifies those threads in which the current message is threaded. It is noted that the format of such information varies from system to system, but the basic information remains the same. Thus, FIG. 2 is exemplary only.

Figure 3A:
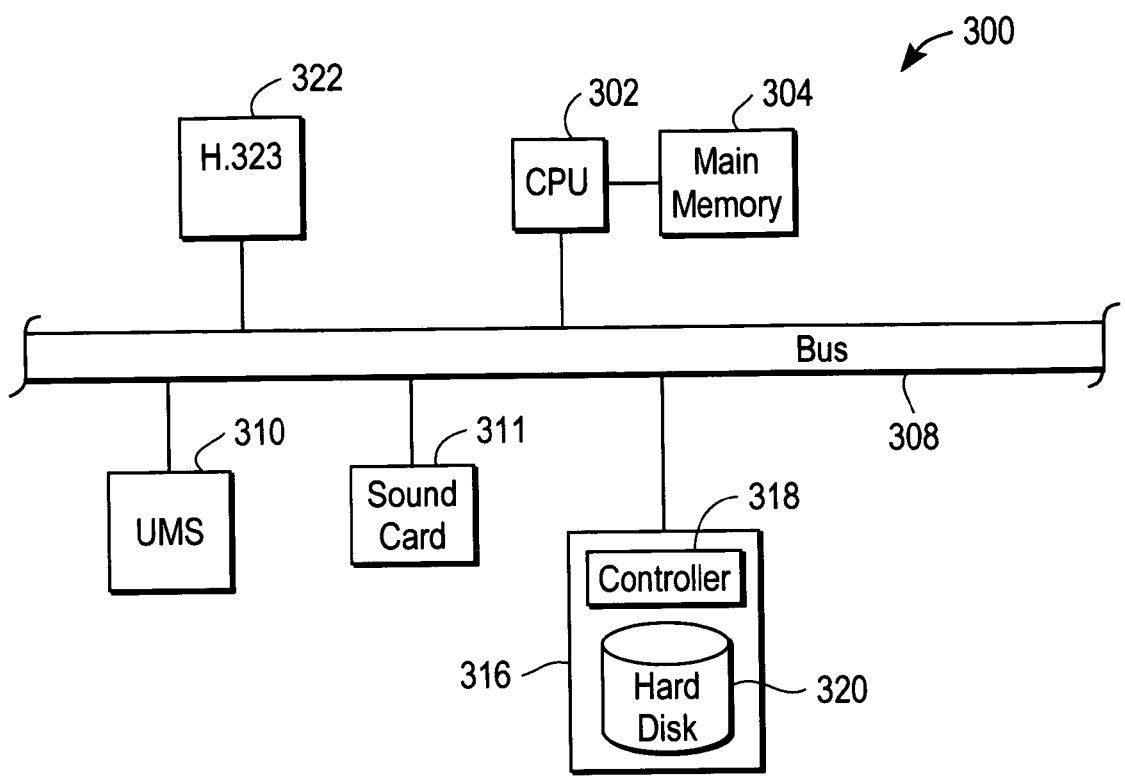
FIG. 3a is a diagram of an exemplary computer system employing a unified messaging system according to an embodiment of the invention.
Figure 3B:
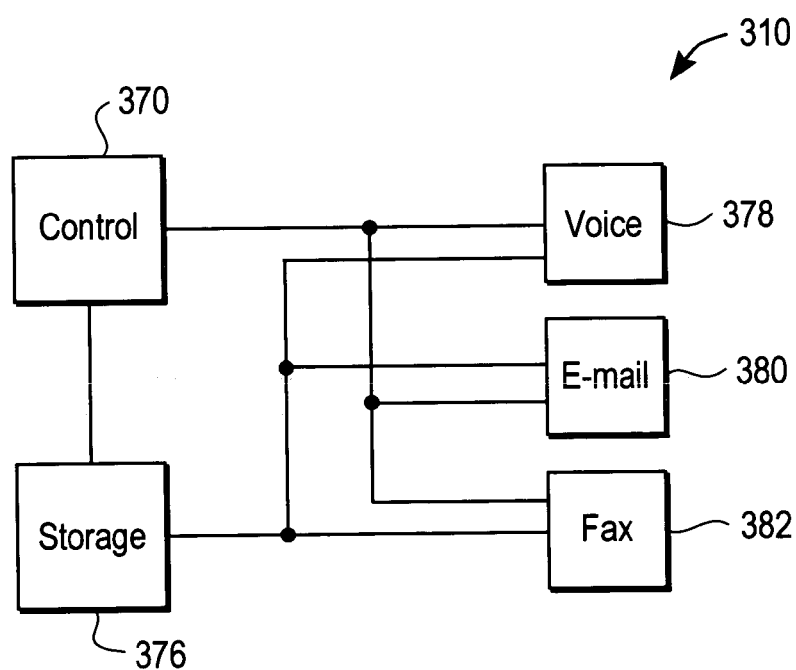
FIG. 3b is a diagram of an exemplary unified messaging system according to an embodiment of the invention.

An exemplary Unified Messaging System according to a specific embodiment of the present invention is illustrated in FIGS. 3A and 3B. More particularly, turning now to FIG. 3A, a computer system 300 includes a central processing unit (CPU) 302, which may be a microprocessor, such as a Pentium, Pentium II or compatible processor. The CPU 302 is coupled to a main memory 304, as well as to an expansion bus 308. The expansion bus 308 may be embodied as any of a variety of known expansion buses, such as a PCI (Peripheral Component Interconnect) bus. Also coupled to the expansion bus 308 is a disk drive 316, including a controller 318 and a hard disk 320. An H.323 interface 322 and a sound card 311 are also provided. Finally, a Unified Messaging System (UMS) 310 is provided, coupled to the expansion bus 308. The UMS 310 may be embodied as any of a variety of known unified messaging systems.

As shown in FIG. 3B, the UMS 310 includes voice mail functionality 378, e-mail functionality 380, and may also include facsimile functionality 382. At the heart of the UMS 310 is a control processor 370, coupled to a memory 376, such as a read-only memory, for storing program code. As will be described in greater detail below, the control processor 370 is configured to process voice, e-mail and facsimile messages and, according to the present invention, identify threaded messages using the received header information (FIG. 2). The UMS 310 stores messages in the memory 320 and plays voice messages via the computer's sound system 311. The computer's sound system 311 may be any of a variety of commonly available sound cards.

Figures 4, 5:
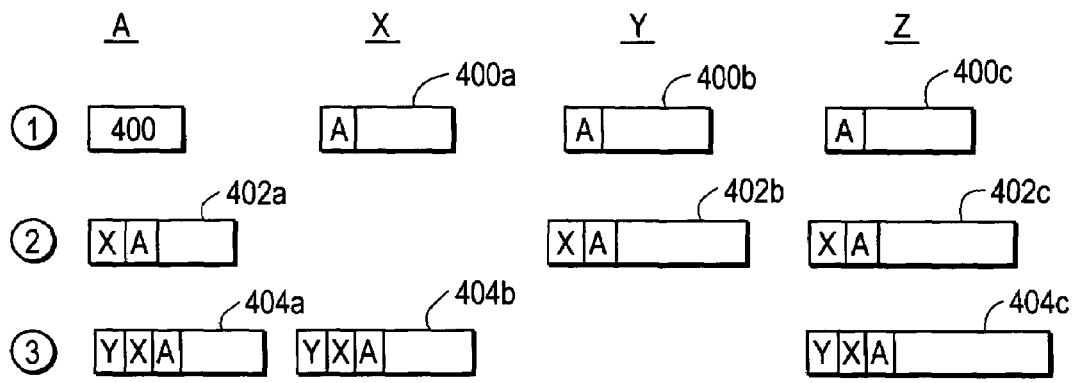
FIG. 4 is a schematic representation of message handling according to an embodiment of the invention.
FIG. 5 is a diagram of an exemplary user interface for the representation of FIG. 4.

The functionality provided by the present invention may be illustrated by way of example. FIG. 4 schematically illustrates message flow according to an embodiment of the invention and, in particular, the contents of various users' mail boxes. For example, initially, User A sends a message 400 to a User X, User Y and User Z. The message 400 is stored by the recipients as message 400a, 400b, and 400c, respectively. As can be appreciated, the stored and received messages include header information identifying User A as the sender. Next, User X forwards the message, with additional comments, to User A, User Y, and User Z. This message is stored by User A, User Y and User Z, as messages 402a, 402b, and 402c, respectively. Again, messages 402a, 402b, and 402c identify the sender (User X), but also identify the original sender, User A, as part of the threading information provided in the header, as described above. It is noted that, while the entire string of messages may be stored and transferred separately at each level of threading, typically, only new headers are transformed and stored. The headers then are used to point to locations in the memory where the full body of the threaded messages are stored. When more inclusive messages are played back, then, the controller will use the header information to access locations in memory where the thread components are stored.

Next, User Y provides additional comments and forwards the message on to Users A, X and Z. The received messages, 404a, 404b, 404c, include at least an identification of that part sent by User X, but also an identification of the sender (User Y), and the identities of the senders of the component threads (Users A and X). It is noted that, for purposes of illustration, the messages described above with respect to FIG. 4 may be e-mail, voice mail or fax or other multi-media messages. As noted above, while the forwarded information may include the entirety of the component threads, typically, only the new content, along with header information identifying the threaded components is transferred and stored. The header information is then used to access locations in memory where the components of the thread have already been stored.

User Z's mailbox thus contains messages 400c, 402c, and 404c. An exemplary graphical user interface (GUI) 500 for a unified messaging system according to the present invention is shown in FIG. 5. The GUI 500 may be, for example, based on Windows 95 or higher, or Windows NT. The GUI 500 includes fields displaying a message number 550, a field for the message subject line 552, a field 554 identifying the message type (i.e., e-mail, voice, or fax), a field identifying the sender 556, a date field 558, and several fields related to threading information. A "threaded in" field 560 is provided, which identifies those messages in which the particular message is threaded. The "threaded in" field 560 may include a "full/part" field 561 to indicate whether the entire message is threaded in particular other messages. Finally, a "component thread" field 562 is provided, which identifies those messages which are threaded into the particular message.

As shown, the GUI 500 represents User Z's in-box, from the example discussed above with regard to FIG. 4. Thus, the messages 400c, 402c, 404c are listed in order. The Sender Field 556 identifies message number 1 as being from User A, message number 2 as being from User X, and message number 3 as being from User Y. The GUI 500 also shows that Message Number 1, from User A, is threaded in messages number 2 and 3.

Similarly, the message from User X (402c), message 2, is shown as being threaded in message number 3. In addition, message number 2 is shown as having as a component message number 1. Finally, the message from User Y (404c) is identified as message number 3. Since it is the final message in the string, it does not have associated with it a "threaded in" message. However, it is shown as having message 1 and message 2 as component threads. As will be explained in greater detail below, the threaded in, component thread, full/part thread, and other information displayed by the GUI 500 is derived from the message header information (FIG. 2).

When the user "clicks" on the most inclusive message in a thread (in this case, message 3 404c), such as by using a pointing device like a mouse or trackball, the message is opened (in the case of e-mail) or played (in the case of voice mail). As the components of the thread (messages 1 and 2) are displayed or played, the messages 1 and 2 are indicated as having been opened, displayed or played. If one of the other messages in the thread is selected, the system will provide the user with a prompt message, giving the user the option to reconsider his selection and choose instead the most inclusive message in the thread.

The user, once having read or listened to the message, may wish to delete the most inclusive message 404c (message 3) or transfer the message to another file. As is known, this may be accomplished through selecting or highlighting the message and pressing "delete." In response, the GUI 500 will delete the message (in practice, transferring it to the deleted message folder). The system will take the same action for the messages 1 and 2, the components of the thread embedded in message 3.

Figure 6:
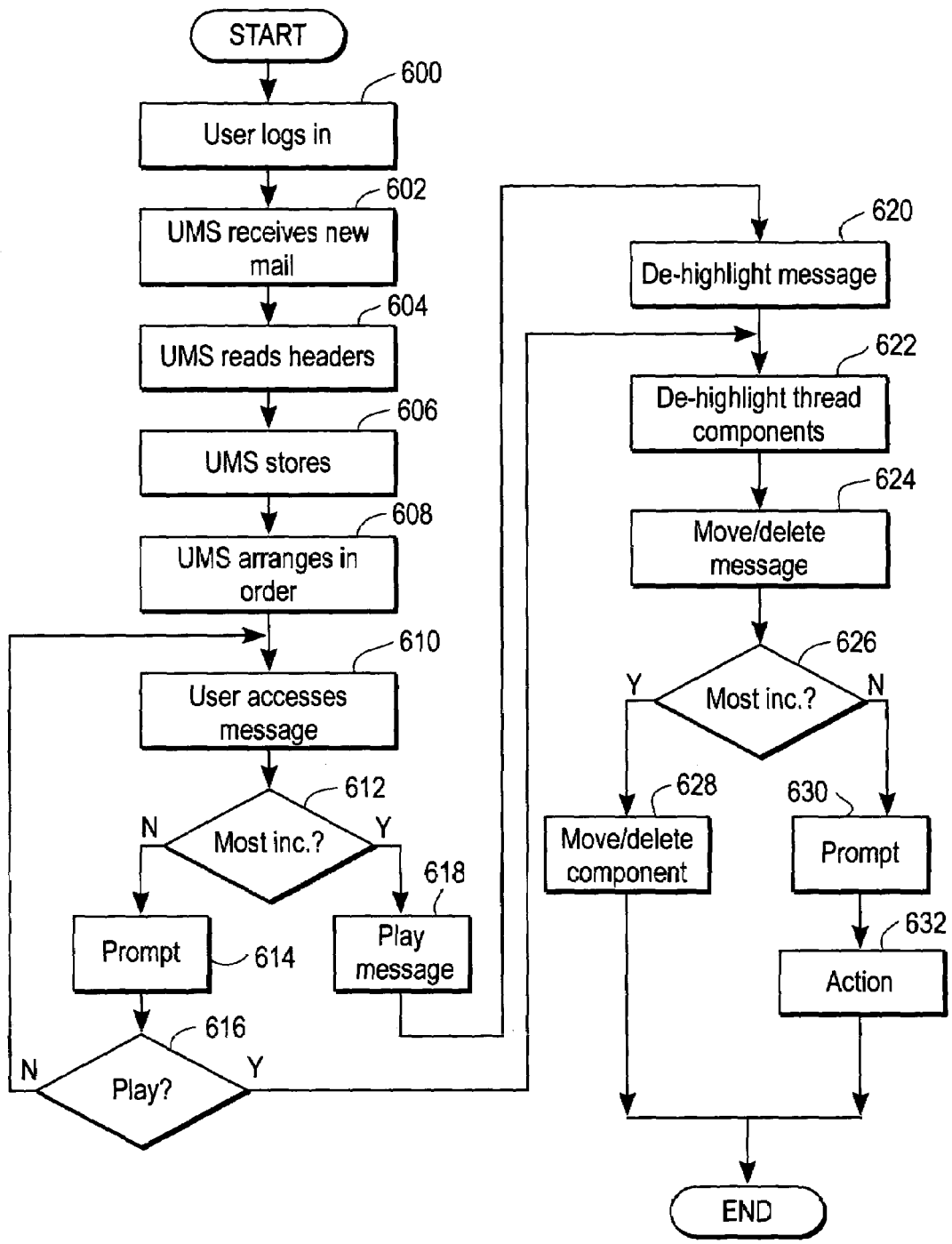
FIG. 6 is a flowchart illustrating operation of an embodiment of the invention.
Figure 7:
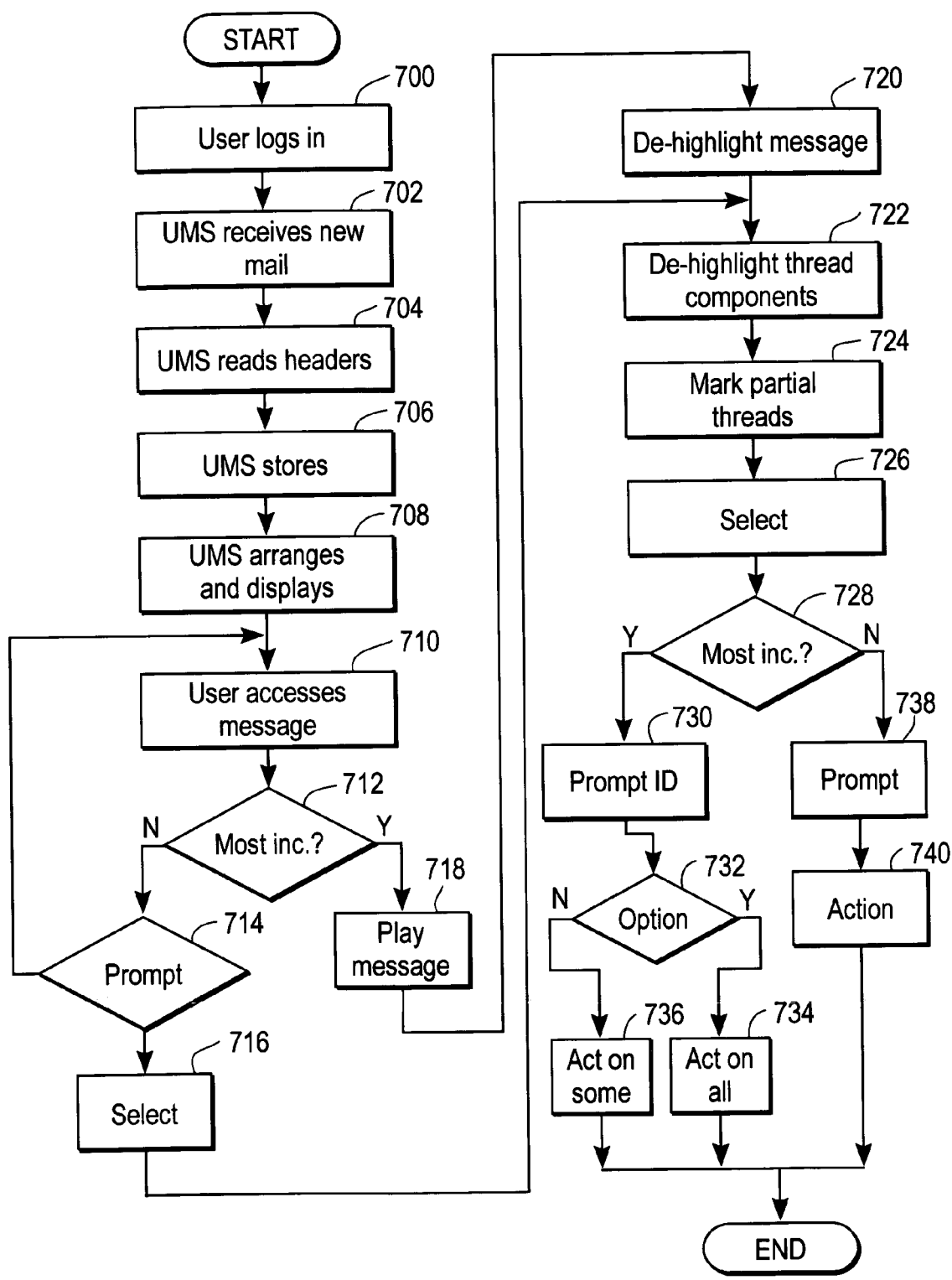
FIG. 7 is a flowchart illustrating operation of another aspect of the invention.

Operation of the Unified Messaging System shown in FIG. 5 is further illustrated in FIG. 6 and FIG. 7. FIG. 6 is a flowchart of threaded message handling voice mail or e-mail with attachments, for example. In a step 600, a user logs in to his or her Unified Messaging System in a known manner. In a step 602, new messages are received by the user's UMS. In doing so, the UMS 310 and, particularly, the controller 370, reads the header information associated with the messages, in a step 604. The messages are stored in the memory 376 in a step 606 and displayed on the GUI 500 in a step 608. As discussed above, typically, the controller 370 identifies those messages, from the header information, which contain or are part of a threaded conversation. Messages associated with the thread are arranged for display on the GUI 500 in reverse chronological order, for example. Further, while the entirety of a threaded message, including its components, may be separately stored, typically, only the new content along with a pointer (in the header) to the threaded components is stored, to conserve memory.

Next, in a step 610, the user accesses one of the messages in the mailbox. For example, the user may highlight the message with a mouse and "click" on the message. In a step 612, the UMS 310 determines whether the message is part of a thread and, if so, whether it is the most inclusive message in the thread. Thus, for example, the controller 370 may read the original header information, or the information displayed by the GUI 500, and determine whether the threaded in field or the component thread field are filled. If the message is the most inclusive, then in a step 618, the message will be played or displayed to the user. In particular, in one embodiment, the header information is used to access locations in the memory where the thread components are stored; alternatively, the entire string, having been separately stored, is simply played back. While this occurs, the original message is de-highlighted in a known manner, or otherwise indicated as having been read or accessed in a step 620. Further, while the thread components are displayed and/or played back, the messages corresponding to thread components are de-highlighted, in a step 622. By reading the "threaded in" field and the thread components field, and knowing which components are being accessed, the controller 370 may access the GUI 500 to identify the components as having been accessed.

Next, in a step 624, the user may undertake some action on the message, such as moving it to another folder, or deleting it. To do so, the user may click to highlight the message and drag it to another folder, in a known manner. In a step 626, the controller 370 determines whether the selected message is the most inclusive message in a threaded string. For example, the header information may be read to determine if thread components exist, or if the particular message itself forms a component of another thread. If the selected message is the most inclusive, then in a step 628, the same action being undertaken with respect to the most inclusive message is done with the thread components. For example, if the most inclusive message is being transferred to another file, the header information is used to identify the component threads and transfer the corresponding components, as well. As can be appreciated, this may include transferring the entire string of messages or simply the headers corresponding thereto. If the selected message is not the most inclusive, then in a step 630, the user may be prompted to select the most inclusive message. Then, in a step 632, appropriate action may be taken.

Back in step 612, if the message was not the most inclusive message, the user may be given a prompt in a step 614 to select another message or continue. For example, a pop-up window may be provided in a known manner. In a step 616, if the user elects not to play the current message, he may be returned to step 610 to select another. However, if the user continues, then the user proceeds to step 622, as described above. Rather than de-highlighting the entire chain of threads, however, only those "lower" may be de-highlighted. Moreover, an alternate highlighting may be provided (e.g., a different color), to indicate that lower messages in a thread have been read, but not higher up ones.

An alternate embodiment of the invention is shown in FIG. 7. In particular, FIG. 7 illustrates the case in which, for e-mail messages, internal threading occurs. That is, parts of other messages are incorporated into a "Reply" type message, in a known manner.

In a step 700, a user logs in to his or her unified messaging system in a known manner. In a step 702, new messages are received by the user's UMS 310. In doing so, the UMS 310 and, particularly, the controller 370, reads the header information associated with the messages, in a step 704. The messages are stored in the memory 376 in a step 706 and displayed on the GUI 500 in a step 708. As discussed above, typically, the controller 310 identifies those messages, from the header information, which contain or are part of a threaded conversation. Messages associated with the thread are arranged for display on the GUI 500 in reverse chronological order, for example. In addition, in the embodiment of FIG. 7, the controller 370 may scan the received messages, comparing them with already received messages, to determine whether all or part of other messages has been incorporated. The display then identifies those messages which include partial threads. Alternatively, "partial thread" information may be provided in the message header on the sender's side. For example, if the sender clicks "Reply", the sender's e-mail system will know that at least a partial thread is occurring. If the sender deletes part of the replied-to message, the sender's e-mail system will recognize a partial thread and flag that only a partial threading is occurring.

Next, in a step 710, the user accesses a message, for example, by clicking on it. In a step 712, the controller 370 determines whether the message is part of a thread and whether it is the most inclusive in the thread, for example, by reading the header information. If so, then in a step 718, the message is displayed. In a step 720, the message is dehighlighted or otherwise indicated as having been accessed. In a step 722, messages whose entire content has been threaded within the most inclusive message are dehighlighted. In a step 724, messages which are partially threaded are marked, for example, by a check mark on the GUI 500, or other indicia.

In a step 726, the user may wish to perform some action on a message and therefore will highlight or otherwise select the message. In a step 728, the system determines whether the message is the most inclusive in a thread, for example, by reading the header information. If it is not, then in a step 738, the user is provided with a prompt identifying the most inclusive message and/or the fact that the message is threaded. In a step 740, the user may perform an action. As noted above, such an action may be deleting 1C the message or transferring it to another folder. In that case, the message will be deleted or transferred, in a known manner. In addition, as discussed above with respect to the previous embodiment, a similar action, such as transferring or deleting, may be performed on the components of the thread.

If, in step 728, the message was the most inclusive, then in a step 730, the user may be prompted with regard to components. In particular, the user may be provided with a pop-up window identifying those messages which are wholly and those messages which are only partially threaded. In a step 732, the user may be given the option of performing the action on all or some of the messages. In a step 734, the user may select those particular messages or, in a step 736, may select and perform the action on all the thread components. For example, if the action was to store the more inclusive message, then the controller will read the corresponding header information and similarly store one or all of the components.

Back in step 712, if the message was not the most inclusive, then in a step 714, the user may be prompted with an identification of the most inclusive message or whether to proceed anyway. For example, the controller 370 may cause a pop-up window to be generated in a known manner. In a step 716, the user may make the selection. If the user plays anyway, he may be sent to step 722, as described above. If the user elects, however, he may select another message and be returned to step 710.

Figure 8:
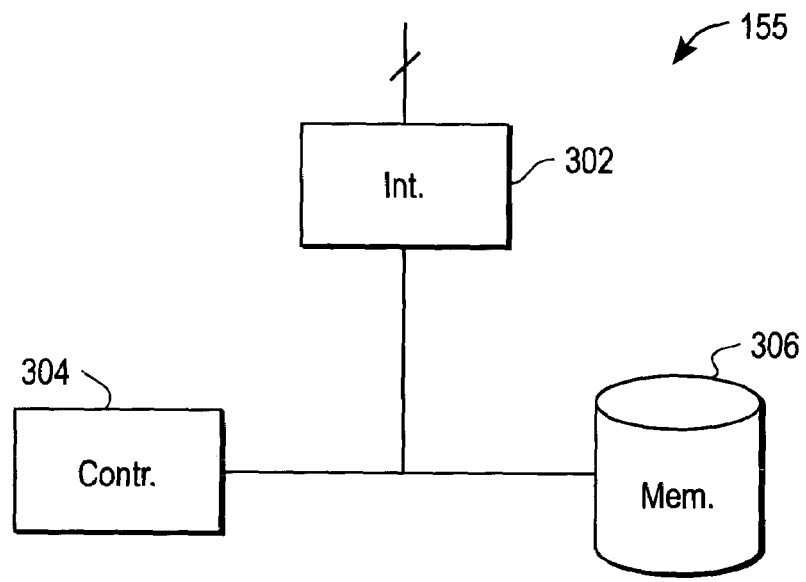
FIG. 8 is a block diagram of an exemplary voicemail system according to an embodiment of the invention.

As discussed generally above, the present invention may be embodied in a messaging system employing an interactive voice response (IVR) system and not employing a GUI. An exemplary voicemail system according to such an embodiment of the invention is shown in FIG. 8. As illustrated, the voicemail system 155 includes a receiver or network interface 302 for receiving messages from the LAN; a controller 304, which is typically microprocessor or digital signal processor (DSP) based, and memory 306, which may be a disk drive, for example. The memory 306 is configured to store a user mailbox, arranged, for example, as an inbox and deleted message box (not shown). The controller 304 reads the incoming messages and provides them to the proper storage location, as will be discussed in greater detail below. In addition, the controller 304 controls the playback of the messages. The voicemail system 155 as illustrated is embodied within the user's H.323 terminal. It is noted, however, that a central server-based voicemail system may also incorporate the present invention. Thus, FIG. 8 is exemplary only.

Figure 9:
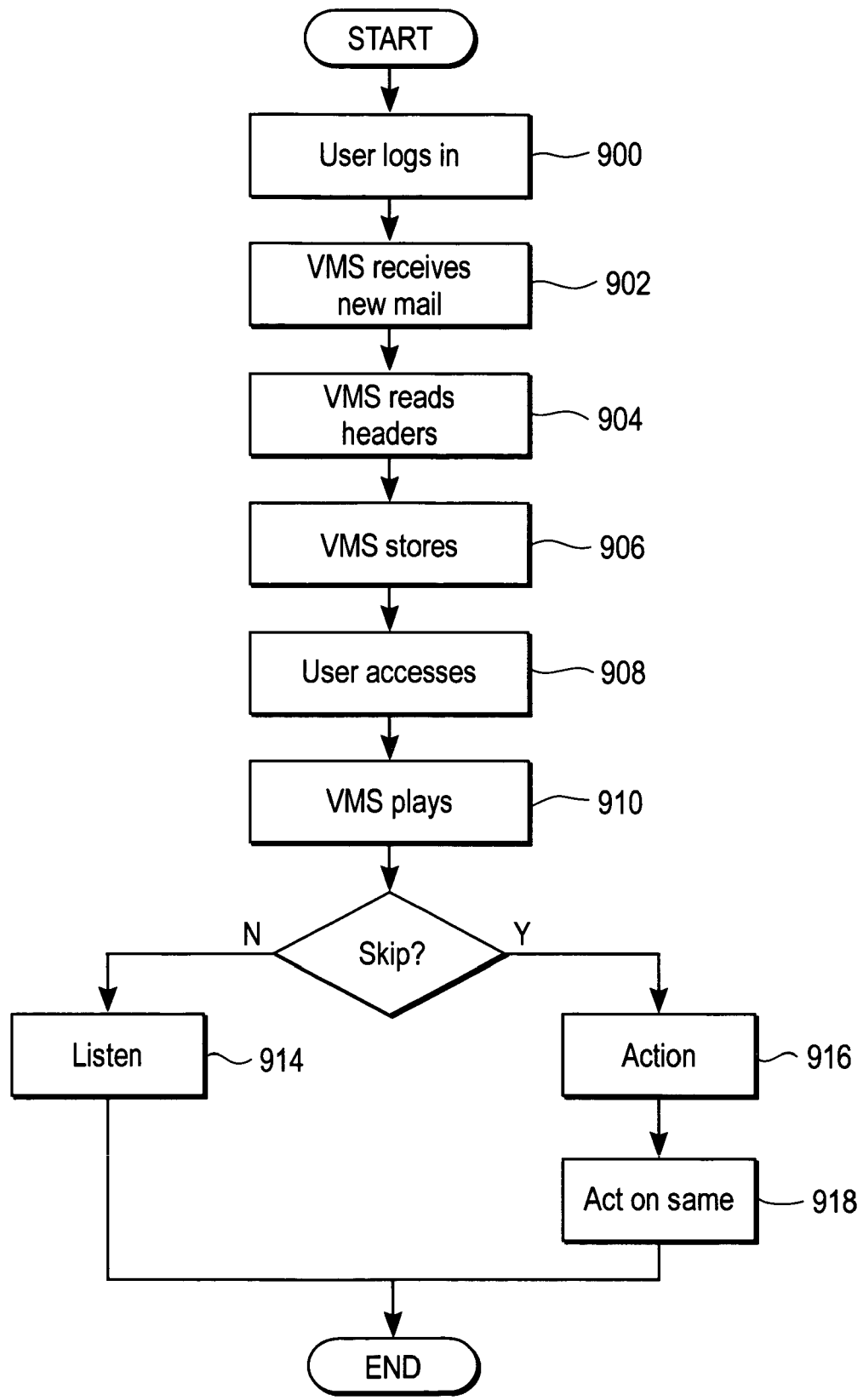
FIG. 9 is a flowchart illustrating operation of an embodiment of the invention.

A flowchart illustrating operation of this embodiment of the invention is shown in FIG. 9. In particular, in a step 900, the user logs in in a known manner. In a step 902, the system 155 may receive a new message. In a step 904, the controller 304 reads the message headers. In a step 906, the controller 304 stores the threaded messages in the memory 306, for access in reverse chronological order, for example. It is noted that, in an alternate embodiment, the messages may be loaded before the user logs in. Further, as noted above, typically, only the new content of a threaded message, along with a pointer to the components, is stored, rather than repeatedly storing the same messages. The pointer, which is typically provided as an identifier in the header, is then used, in a known manner, to access the components.

In a step 908, the user accesses a message, for example, in a response to a voice prompt. In a step 910, the VMS 155 plays the selected message. In a step 912, the VMS 155 provides a voice prompt to listen to or skip messages which may be threaded within the already listened-to message. For example, the VMS 155 may read the header information and use it to access components. If the user wishes, in a step 914, the user may listen to the component messages. Otherwise, the messages are tagged and the user is prompted, in a step 916, to save the message. If the user elects to save the message, the components are also saved, in a step 918. As noted above, saving the components may include merely saving the header information which points to memory locations where the less inclusive messages are stored. However, if the user elects not to, then the components are similarly deleted. The user may then access messages other than those in the thread.

What is claimed is:

1. A messaging system, comprising:
 a memory for storing one or more messages, wherein some of said one or more messages are threaded within others of said one or more messages, wherein a threaded message includes at least a portion of another message, wherein said memory stores only new content of messages threaded within other messages; and
 a controller for identifying which of said one or more messages are threaded within said others and accessing said some threaded within messages when said others are accessed and indicating in a display separate from said threaded message that said at least a portion of another message threaded in said threaded message has been read when said threaded message has been read.

2. A messaging system in accordance with claim 1, said one or more messages being e-mail messages.

3. A messaging system in accordance with claim 1, said one or more messages being voice mail messages.

4. A messaging system in accordance with claim 1, said controller being configured to provide a prompt to a user if said user selects a message which is threaded within another message.

5. A messaging system in accordance with claim 1, wherein said messaging system comprises a voice mail system.

6. A messaging system in accordance with claim 1, wherein said messaging system comprises a telephony-over-LAN messaging system.

7. A messaging system, comprising:
   a memory for storing one or more messages, wherein some of said one or more messages are threaded within others of said one or more messages, wherein a threaded message includes at least a portion of another message, wherein said memory is configured to store only new content of a threaded message; and
   a controller for identifying which of said one or more messages are threaded within said others; said controller being configured to indicate that a message threaded within another message has been accessed when only said another message in which said message has been threaded has been accessed.

8. A messaging system in accordance with claim 7, wherein said controller Is configured to perform an action on said another message having other messages threaded within it and automatically perform said action on said messages threaded within it.

9. A messaging system in accordance with claim 8, said action being deleting said another message.

10. A messaging system in accordance with claim 8, said action being saving said another message.

11. A method for operating a messaging system, comprising:
   storing one or more first messages;
   storing one or more second messages, at least one of said one or more first messages being threaded within said one or more second messages, wherein at least a portion of said one or more first messages is included within said one or more second messages, wherein only new content of a threaded message is stored;
   identifying to a user which of said one or more messages are threaded within said others; and
   accessing said one or more first messages responsive to accessing said one or more second messages.

12. A method in accordance with claim 11, including providing a prompt to a user if said user selects a message which is threaded within another message.

13. A method for operating a messaging system, comprising:
   storing one or more first messages;
   storing one or more second messages, at least one of said one or more first messages being threaded within said one or more second messages, wherein at least a portion of said one or more first messages is included within said one or more second messages, wherein only new content of a threaded message is stored; and
   identifying to a user which of said one or more messages are threaded within said others, said identifying including indicating that a message threaded within another message has been accessed when only said another message in which said message has been threaded has been accessed.

14. A method in accordance with claim 13, including performing an action on said another message having other messages threaded within it and automatically performing said action on said other messages threaded within it.

15. A method in accordance with claim 14, said performing including deleting said another message.

16. A method in accordance with claim 15, said performing Including saving said another message.

17. A method in accordance with claim 16, said one or more first messages being e-mail messages.

18. A method in accordance with claim 16, said one or more first messages being voice mail messages.

19. A method in accordance with claim 16, wherein said messaging system comprises a voice mail system.

20. A method in accordance with claim 16, wherein said messaging system comprises a telephony-over-LAN messaging system.

* * * * *